April 4, 1939.  J. J. SEAVER  2,152,774
VALVE CONSTRUCTION
Filed Aug. 19, 1936  2 Sheets-Sheet 1

Inventor:
Jay J. Seaver,

April 4, 1939.  J. J. SEAVER  2,152,774
VALVE CONSTRUCTION
Filed Aug. 19, 1936  2 Sheets-Sheet 2
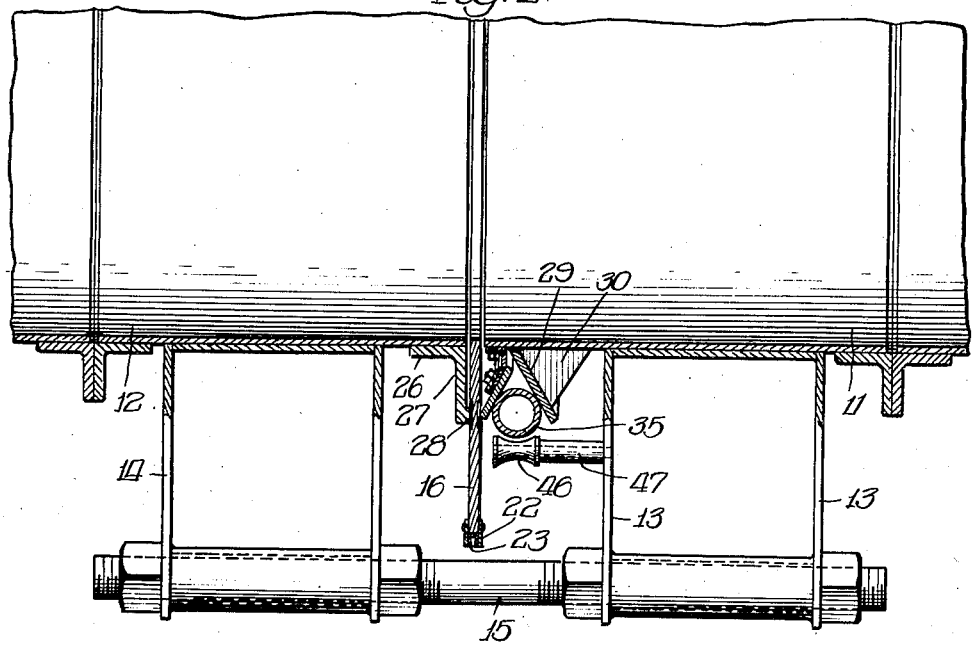
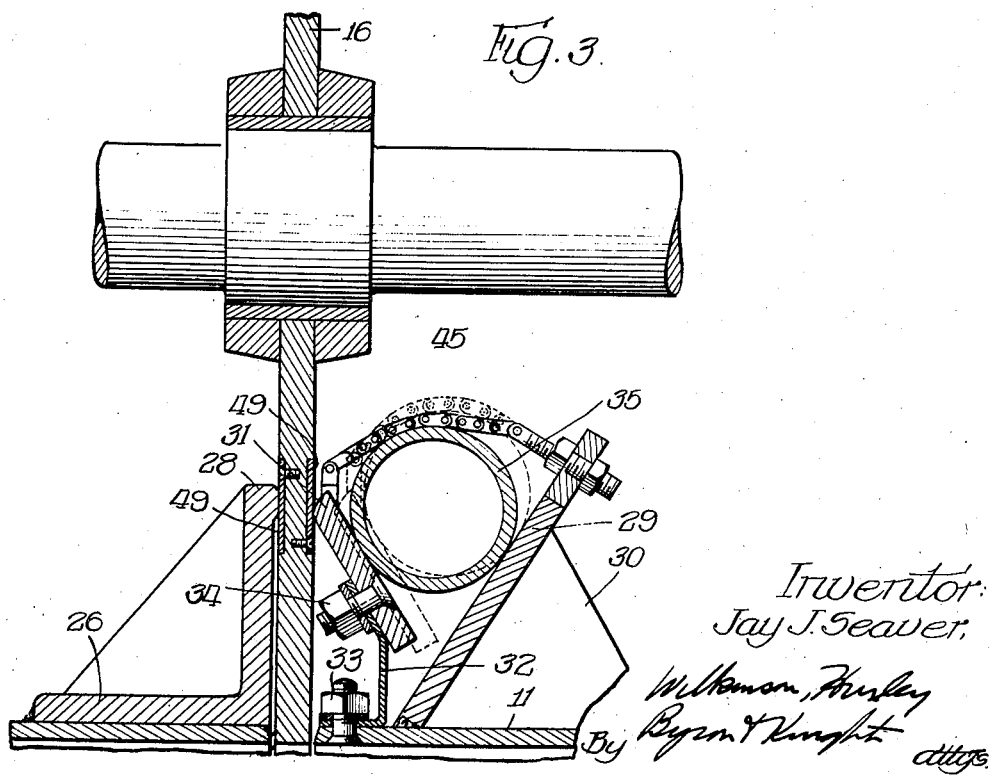
Inventor:
Jay J. Seaver Patented Apr. 4, 1939

2,152,774

UNITED STATES PATENT OFFICE 2,152,774

VALVE CONSTRUCTION

Jay J. Seaver, Chicago, Ill., assignor to H. A. Brassert & Company, Chicago, Ill., a corporation of Illinois Application August 19, 1936, Serial No. 96,769

4 Claims. (Cl. 251—167)

This invention relates to a new and improved valve construction and more particularly to goggle valves such as are used in the metallurgical industries to control the flow through air and gas mains and the like.

With valves of this type, it is important that the main be sealed effectively in both the open and closed position of the valve and also is highly desirable that the main be unobstructed with the valve in the open position.

It is an object of the present invention to provide a new and improved goggle valve with efficient sealing means.

It is an additional object to provide a valve construction employing sealing gaskets in both the open and closed valve positions.

It is also an object to provide a valve which is positively both sealed and unsealed.

It is a further object to provide a sealing construction which does not obstruct the main with the valve in the open position.

It is another object to provide a valve having simple and positive operating means.

Other and further objects will appear as the description proceeds.

I have shown a preferred embodiment of my invention in the accompanying drawings, in which—

Figure 2 is a fragmentary section on a plane through the axis of the main; and

Figure 3 is a fragmentary section on an enlarged scale taken transversely of the valve.

Figure 1:
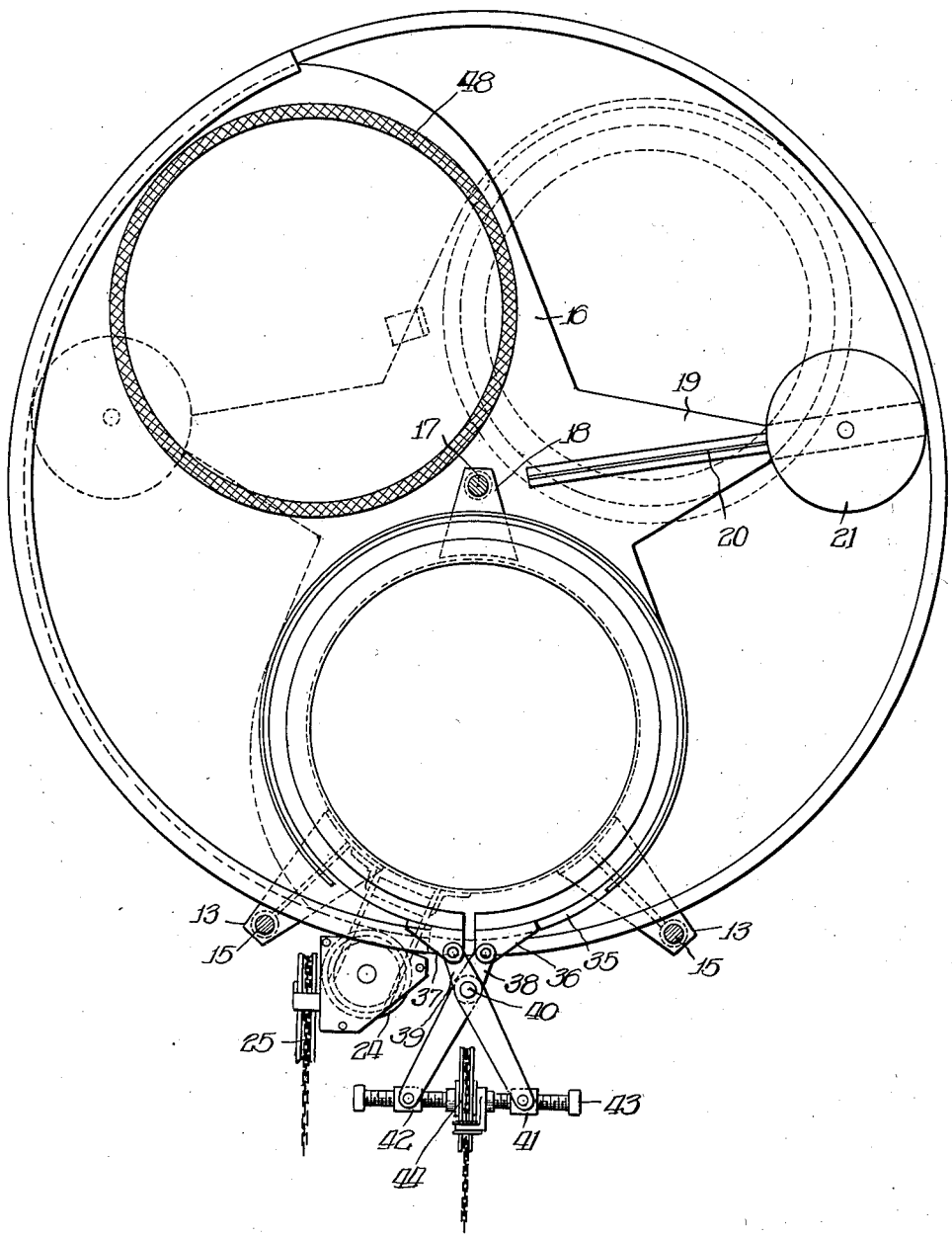
Figure 1 is a vertical section, taken transversely of the main showing the valve in vertical elevation.

The main comprises the two sections 11 and 12 which are provided with a plurality of brackets 13 and 14 connected by bolts 15 to retain the spaced ends of the main in proper alignment and spacing. The valve member 16 is pivoted upon the bolt 17 which is supported by the upper brackets 18 in a manner similar to the bolts 15. The valve member 16 is provided with an extension 19 which may be stiffened by a T-shaped member 20, and carries a counterweight 21 to counterbalance the main body of the valve. The edge of the body of the valve 16 is formed on a circular arc and carries a pair of narrow plates 22 along its periphery. These plates are connected by studs 23 which are evenly spaced and serve as teeth for coacting with the gear 24 which is mechanically driven through pulley 25 to rotate the valve about its axis on the bolt 17. The two lines extending on a circular arc in the right hand portion of Figure 1 merely indicate the clearance line for the valve in its rotation.

The circular fixed abutment member 26 is secured to the end of the main section 12 adjacent the valve, and is provided with the portion 27 extending substantially parallel with the valve but spaced therefrom. Adjacent its outer end this portion 27 is provided with the circular abutment flange 28. The adjacent end of the main 11 is provided with a fixed thrust ring 29, the face 10 of which is located at an angle relative to the valve 16 and is positively secured to the main and supported therefrom by the wedge-shaped members 30. The second abutment member 31 is connected to the main section 11 by means of a resilient circular flange 32. This flange 32 is shown as secured to the end of the main 11 by means of bolts 33 and similarly secured by bolts 34 to the abutment member 31. The member 32 makes a gas-tight connection with both the main and the movable abutment member 31. The resilient member 32 is biased to normally move the member 31 to the broken line position of Figure 3.

The wedging ring 35 is located between the thrust ring 29 and the movable abutment 31. In the form shown, this member 35 consists of a pipe which is bent to form practically a complete circle. The adjacent ends of the member 35 are connected by brackets 36 and 37 to the ends of the pivoted levers 38 and 39. These levers are pivoted together at 40 to form a scissors, and their outer ends are pivotally connected to travellers 41 and 42 which move on the right and left hand threads on the spreader member 43 when this member is rotated by means of the pulley 44.

The thrust ring 29 and the movable abutment member 31 have their outer edges connected at spaced intervals by means of the flexible chains 45 which extend around the upper face of the wedging ring 35. Supporting rollers 46 are carried on brackets 47 extending from the brackets 13 as best shown in Figure 2. These rollers 46 serve to support the wedging ring 35 when it is in its expanded position.

The valve member 16 is provided with a circular inset packing member 48 upon each face of the portion which is interposed between the ends of the main when the valve is in closed position. These packing rings 48 are adapted to be engaged by the fixed and movable abutment members when the valve is sealed in closed position. A similar pair of aligned packing rings 49 are provided located concentrically with the opening in the valve 16 and adapted to be engaged by the fixed and movable abutment members when the valve is in open position. As best shown in Figure 3, these packing rings are recessed into the valve member 16 so that they are flush with the surface of the valve member, which facilitates the movement of the valve and makes it unnecessary to widely separate the fixed and movable abutment members.

The valve is shown in Figure 1 in closed position. In order to open the valve it is first necessary to unseal it. This is accomplished by rotating the pulley 44 to spread apart the ends of the levers 38 and 39 which are connected to the wedging member 35. As these ends are spread apart, the member 35 increases in diameter and by engagement with the cross chains 45 serves to pull the movable abutment member 31 away from contact with the packing carried by the valve disc. In order to equalize the movement of the member 31 away from the valve, the fixed support rollers are provided so that the wedging ring 35 can only drop down a limited amount vertically and further expansion must cause the upper portion of the ring to lift and by means of the chains 45 equally pull away the upper portion of the member 31 from the valve.

When the valve has been fully released, it is swung to closed position by rotation of the pulley 25 which causes the gear 24 to rotate in mesh with the pins 23 on the edge of the disc. This positively drives the valve member in the counterclockwise direction as seen in Figure 1. This movement is continued until the packing rings 48 are brought in proper registration with the abutment flange 28 of the fixed abutment member 26 and with the upper edge of the movable abutment member 31. The valve is then sealed by rotating the pulley 44 in reverse direction so as to draw together the ends of the wedging ring 35. By its engagement with the fixed abutment member 29 this ring 35 as it contracts overcomes the resistance of the spring support 32 of the movable abutment member 31 and forces its outer edge in engagement with the packing 48. This lateral thrust also forces the packing ring 48 upon the opposite side of the valve member 16 into engagement with the abutment flange 28 on the fixed abutment member 26.

The form of construction shown affords a positive sealing and insulating action of the valve and all of the sealing parts are located exteriorly of the main, which is open for unobstructed passage of the gas or air carried therein.

While I have shown a preferred embodiment of my invention, this is to be understood to be illustrative only, as I contemplate such changes and modifications as come within the spirit and scope of the appended claims.

I claim:

1. In combination, a gas main with a fixed gap therein and a goggle valve pivoted adjacent the main and having open and closed portions adapted to be selectively interposed in said gap, a circular fixed abutment member carried by one end of the main adjacent the gap, said member having a portion extending outwardly from the main and substantially parallel with the valve, a second abutment member movably connected to the main adjacent the second side of the gap and extending angularly outward toward the valve, a fixed thrust ring secured to the main adjacent the second abutment and extending angularly outward away from the valve, a wedging ring between the second abutment and thrust ring, means for positively expanding and contracting said ring, means connecting the second abutment and wedging ring whereby the second abutment is positively drawn away from the valve member when said thrust ring is expanded, and means for centering the wedging ring relative to the main when said ring is expanded, said means comprising fixed supports spaced from the ring when the ring is contracted.

2. In combination, a gas main with a fixed gap therein and a goggle valve pivoted adjacent the main and having open and closed portions adapted to be selectively interposed in said gap, a circular fixed abutment member carried by one end of the main adjacent the gap, said member having a portion extending outwardly from the main and substantially parallel with the valve, a second abutment member movably connected to the main adjacent the second side of the gap and extending angularly outward toward the valve, a fixed thrust ring secured to the main adjacent the second abutment and extending angularly outward away from the valve, a wedging ring between the second abutment and thrust ring, means for positively expanding and contracting said ring, means connecting the second abutment and wedging ring whereby the second abutment is positively drawn away from the valve member when said thrust ring is expanded, said means comprising flexible members connected to the second abutment and thrust ring and extending across the outer face of the wedging ring, and means for centering the wedging ring relative to the main when said ring is expanded, said means comprising fixed supports spaced from the ring when the ring is contracted.

3. In combination, a gas main with a gap therein and a goggle valve pivoted adjacent the main and having open and closed portions adapted to be selectively interposed in said gap, a circular fixed abutment member carried by one end of the main adjacent the gap, said member having a portion extending substantially parallel with the valve, a second abutment member movably connected to the main adjacent the second side of the gap, a fixed thrust ring secured to the main adjacent the second abutment, a wedging ring between the second abutment and thrust ring, means for positively expanding and contracting said ring, and means for centering the wedging ring relative to the main when said ring is expanded, said means comprising fixed supports spaced from the ring when the ring is contracted.

4. In combination, a gas main with a gap therein and a goggle valve pivoted adjacent the main and having open and closed portions adapted to be selectively interposed in said gap, a circular fixed abutment member carried by one end of the main adjacent the gap, said member having a portion extending substantially parallel with the valve, a second abutment member movably connected to the main adjacent the second side of the gap, a fixed thrust ring secured to the main adjacent the second abutment, a wedging ring between the second abutment and thrust ring, means for positively expanding and contracting said ring, and means for centering the wedging ring relative to the main when said ring is expanded, said means comprising fixed abutments below the ring to limit movement of the wedging ring away from the axis of the main when the ring is expanded.

JAY J. SEAVER.